C. A. ARENTS.
FLY CATCHER.
APPLICATION FILED JAN. 9, 1908.
12,884. Reissued Nov. 24, 1908.
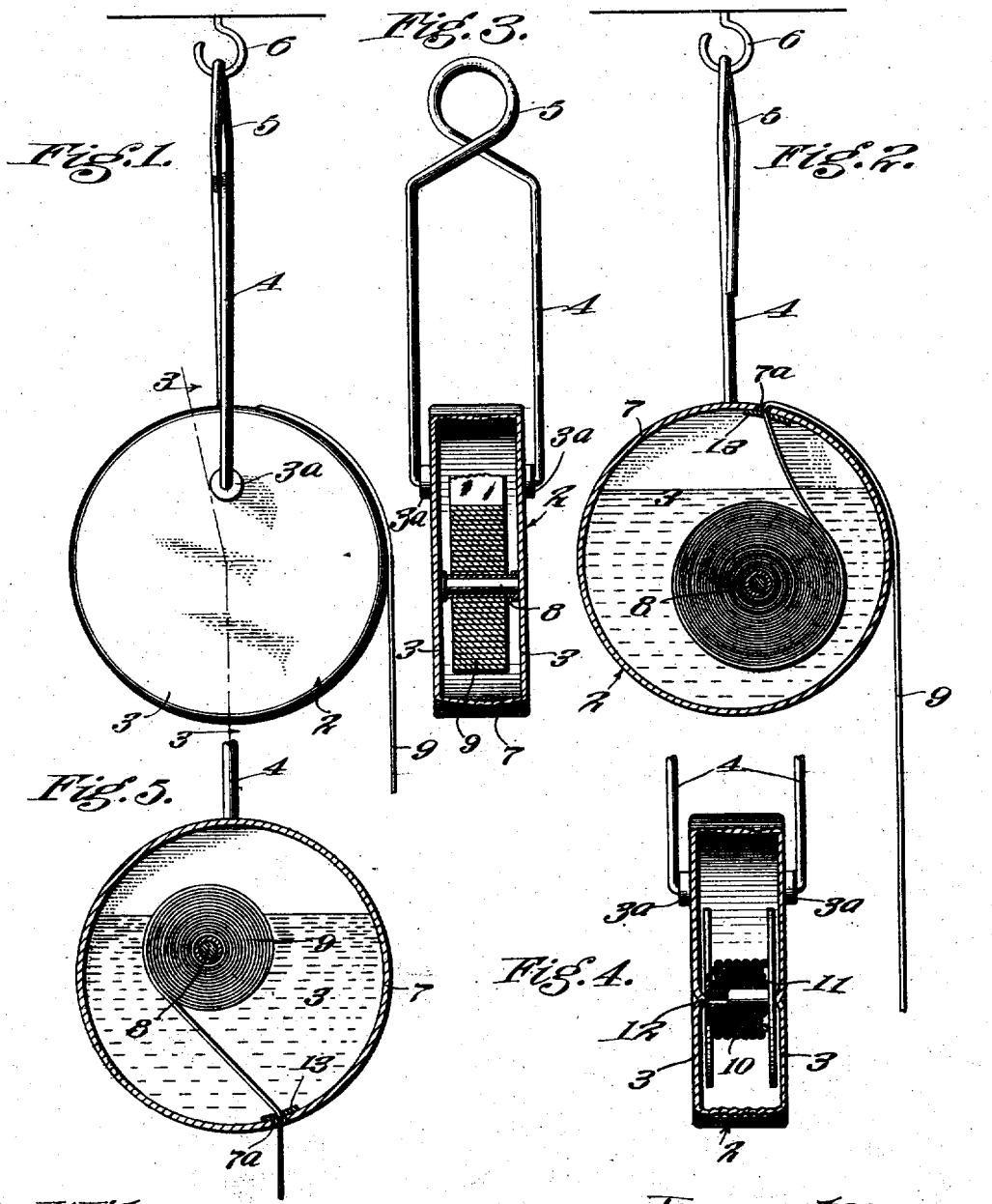
Witnesses
Jno. H. Barbelow
Ollie Palmer
Inventor
Curt A. Arents
Hazard & Strauss
Attorneys.
THE NORRIS PETERS CO., WASHINGTON, D. C.

UNITED STATES PATENT OFFICE.

CURT A. ARENTS, OF ALAMEDA, CALIFORNIA.

FLY-CATCHER.

No. 12,884. Specification of Reissued Letters Patent. Reissued Nov. 24, 1908.

Original No. 851,478, dated April 23, 1907, Serial No. 330,754. Application for reissue filed January 9, 1908. Serial No. 410,068.

*To all whom it may concern:*

Be it known that I, CURT A. ARENTS, a citizen of the United States, residing at Alameda, in the county of Alameda and State of California, have invented new and useful Improvements in Fly-Catchers, of which the following is a specification.

My invention relates to fly catchers, and broadly and generally speaking it consists of a receptacle adapted to contain a glutinous or viscous matter, a tape or cord adapted to be contained within and withdrawn from the receptacle to expose a coated portion thereof, and means adapted to support the receptacle.

An object of the invention is to provide a fly catcher wherein the receptacle is eccentrically journaled upon the supporting means, and wherein the opening, through which the tape or cord is adapted to be withdrawn, has such relation to the journal of the receptacle that it is normally retained in position to prevent the escape of the glutinous or viscous matter and the tape or cord, thus permitting the use of a comparatively thin solution of viscous matter.

A further and important object of the invention is to so arrange the opening through which the tape or cord emerges from the receptacle that when a downward pull is exerted upon the tape or cord the receptacle is freely revolved upon its support to permit the tape or cord to be readily withdrawn.

A further object of the invention is to provide means which is designed to regulate the amount of glutinous or viscous matter adhering to that portion of the tape or cord withdrawn from the receptacle and to prevent the escape of the matter from the receptacle during the operation of withdrawing the tape or cord.

With the above and other objects in view, the invention consists of the construction, combination and arrangement of parts hereinafter fully described, claimed and illustrated in the accompanying drawings, in which—

Figure 1,—is a view in side elevation of a fly catcher constructed in accordance with my invention. Fig. 2,— is a vertical central section therethrough. Fig. 3,— is a section through the receptacle on the plane indicated by the line 3—3 of Fig 1. Fig. 4,— is a similar view, illustrating a slightly modified construction. Fig. 5,— is a vertical central section through the receptacle, illustrating the position it assumes during the operation of withdrawing the tape or cord therefrom.

Referring to the drawings by reference numerals, 2 designates a receptacle which, although shown to be circular, may be of any suitable formation. The receptacle is provided on the outer surface of its side walls 3 with diametrically opposed and eccentrically arranged bearings $3^a$, which are adapted to receive the journals of a support, which is preferably in the form of a hanger 4 provided with a loop or eye 5 by which the receptacle may be supported from the ceiling of a room through the medium of a hook 6. The receptacle is provided in its peripheral wall 7 with an opening $7^a$ through which the tape or cord contained within the receptacle is adapted to be withdrawn. The opening $7^a$ is preferably located in alinement with approximately the shortest distance between the bearings $3^a$ and its peripheral wall, whereby, as the receptacle is eccentrically mounted upon the support, said opening is normally retained at the top thereof. Inasmuch as the opening $7^a$ is retained at a point near the top of the receptacle the glutinous or viscous matter is prevented from escaping, thus permitting the use of a comparatively thin solution of matter.

When it is desired to use a tape, the same is wound upon a small journal 8 which is eccentrically mounted within the receptacle, said journal being preferably located at a point below the bearings $3^a$. Prior to mounting the tape upon the journal 8, the same, which is designated 9 in the drawings, is wound one or more times upon itself, the convolutions of the tape thus formed being secured together in any suitable manner to provide a hub, after which the tape is wholly wound upon the hub, said hub being provided with an opening for the reception of the journal 8. After the tape has been placed within the receptacle 2, the free end thereof is passed through the opening $7^a$.

When it is desired to use a cord, which in the drawings is designated by the numeral 10, the same is wound upon a spool 11 which is eccentrically journaled within the receptacle below the bearings $3^a$. The spool is mounted upon the bearings 12 formed by inwardly depressing the side walls 3 of the receptacle.

The tape or cord is adapted to be coated with a thin solution of glutinous or viscous matter which is adapted to be contained by the receptacle 2. To prevent the escape of the glutinous or viscous matter during the operation of withdrawing a portion of the tape or cord from the receptacle, a scraper 13 is secured to the inner surface of the peripheral wall 7 of the receptacle 2 about the opening $7^a$. The scraper 13 is provided with an opening which is smaller than the opening $7^a$ in the peripheral wall of the receptacle 2 and through which the tape or cord passes. The wall of the opening in the scraper is adapted to engage the tape or cord and remove all superfluous glutinous or viscous matter therefrom. Inasmuch as the opening in the scraper is smaller than the opening $7^a$ in the receptacle 2, the scraper prevents the tape or cord from being brought into contact with and injured by the wall of the opening $7^a$ while being withdrawn from the receptacle.

The fly catcher is preferably supported from the ceiling of a room, and the tape or cord is withdrawn therefrom to expose a coated portion thereof. As the receptacle 2 is eccentrically journaled upon the support, the opening $7^a$ therein is retained normally near the top thereof, thereby preventing the escape of any of the glutinous or viscous matter and the tape or cord. As the tape or cord emerges from the receptacle near the top thereof and outside a line through the point of support and the pulling point, a downward pull upon the tape or cord will revolve the receptacle upon the support and permit the tape or cord to be freely withdrawn. After sufficient length of the tape or cord has been withdrawn, the receptacle will automatically rotate upon its support to position the opening $7^a$ above the bearings $3^a$. The glutinous or viscous matter contains an ingredient which gives to it a fly attracting odor. It is desirable to use a tape or cord of a length to last several months.

From the foregoing description taken in connection with the accompanying drawings, the construction and mode of operation of the invention should be understood without further extended description.

Changes in the form, proportions and minor details of construction may be made within the scope of the claims without departing from the sacrificing any of the advantages of the invention.

Opening $7^a$ is not necessarily placed above the journal point of the receptacle as it is only necessary to place the same high enough to enable a sufficient quantity of liquid to be placed in the receptacle. It is obvious that no matter where the opening is located the above described action will take place, the opening coming to the bottom whenever a pull is exerted on the tape. Furthermore the eccentricity of the receptacle may be more or less than that shown, the weight of the roll of tape sufficing to keep the receptacle normally in its upright position.

Having described my invention what I claim as new and desire to secure by Letters Patent is:—

1. A fly catcher, comprising a support, a liquid receptacle journaled on said support, said receptacle being provided above the liquid level thereof with an opening, a scraper on said receptacle adjacent said opening, and a tape coiled within said receptacle below the center thereof and passing out through said scraper.

2. A fly catcher, comprising a support, a liquid receptacle eccentrically journaled on said support, said receptacle having an opening above the liquid level thereof, and a tape coiled within said receptacle and passing out through said opening.

3. A fly catcher, comprising a support, a liquid receptacle eccentrically journaled on said support, said receptacle being provided with an opening above the liquid level thereof, a scraper on said receptacle adjacent said opening, and a tape coiled within said receptacle and passing out through said opening and against said scraper.

4. A fly catcher, comprising a support, a receptacle eccentrically journaled upon the support and provided with an opening located therein above the journal of the receptacle, and a tape contained within the receptacle and adapted to be withdrawn therefrom through said opening.

5. A fly catcher, comprising a support, a receptacle eccentrically journaled upon the support and provided with an opening located therein at a point above the journal of the receptacle, means eccentrically journaled within the receptacle, and a tape carried by said means and adapted to be withdrawn from the receptacle through said opening.

6. A fly catcher, comprising a support, a receptacle eccentrically journaled upon the support and provided with an opening located above the journal of the receptacle, a tape contained within the receptacle and adapted to be withdrawn therefrom, and a scraper secured within the receptacle about the opening, said scraper being provided with an opening alining with the opening in the receptacle and through which the tape is adapted to be withdrawn.

7. A device of the class described comprising, a journaled receptacle and a coil of flexible material disposed within said receptacle below the center thereof and adapted to be withdrawn therefrom.

8. A device of the class described, comprising, a journaled liquid receptacle provided above the liquid level thereof with an opening, and a coil of flexible material disposed within said receptacle and adapted to be withdrawn through said opening.

9. A device of the class described, comprising, a journaled receptacle provided above its bottom with an opening, and a coil of flexible material disposed within said receptacle below the center thereof and adapted to be withdrawn through said opening.

10. A device of the class described, comprising, a journaled liquid receptacle provided above the liquid level thereof with an opening, a scraper secured to said receptacle adjacent said opening, and a coil of flexible material disposed within said receptacle and adapted to be withdrawn therefrom through said opening.

11. A device of the class described, comprising a receptacle, adapted to contain an adhesive liquid and having an opening in the top thereof above the surface of the adhesive liquid, and a coil of flexible material contained within said receptacle below the surface of said adhesive material and adapted to be withdrawn therefrom through said opening.

In witness that I claim the foregoing I have hereunto subscribed my name.

CURT A. ARENTS.

Witnesses:

CURT ROEMER,
MARY ROEMER.